United States Patent
Ohnuma

(10) Patent No.: US 10,911,887 B2
(45) Date of Patent: Feb. 2, 2021

(54) SOUND SYSTEM

(71) Applicant: SHARP KABUSHIKI KAISHA, Sakai (JP)

(72) Inventor: Atsushi Ohnuma, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/549,445

(22) Filed: Aug. 23, 2019

(65) Prior Publication Data
US 2020/0077224 A1 Mar. 5, 2020

(30) Foreign Application Priority Data

Aug. 28, 2018 (JP) .................................. 2018-159099

(51) Int. Cl.
| | |
|---|---|
| *H04S 7/00* | (2006.01) |
| *H04R 29/00* | (2006.01) |
| *H04R 3/12* | (2006.01) |
| *G06F 16/60* | (2019.01) |
| *H04R 3/00* | (2006.01) |
| *G06F 16/687* | (2019.01) |
| *H04R 1/20* | (2006.01) |

(52) U.S. Cl.
CPC ............... *H04S 7/40* (2013.01); *G06F 16/60* (2019.01); *H04R 3/12* (2013.01); *H04R 29/002* (2013.01); *H04R 29/005* (2013.01); *H04R 2499/15* (2013.01)

(58) Field of Classification Search
None
See application file for complete search history.

(56) References Cited

U.S. PATENT DOCUMENTS

| | | | | |
|---|---|---|---|---|
| 7,130,428 B2* | 10/2006 | Hirai | ...................... | H03G 3/32 |
| | | | | 381/66 |
| 2005/0152557 A1* | 7/2005 | Sasaki | ..................... | H04S 7/302 |
| | | | | 381/58 |
| 2007/0133813 A1* | 6/2007 | Morishima | .............. | H04R 5/02 |
| | | | | 381/59 |
| 2008/0025518 A1* | 1/2008 | Mizuno | ................... | H04S 3/002 |
| | | | | 381/17 |

(Continued)

FOREIGN PATENT DOCUMENTS

JP 2004-126941 A 4/2004

*Primary Examiner* — Qin Zhu
(74) *Attorney, Agent, or Firm* — ScienBiziP, P.C.

(57) ABSTRACT

This sound system includes a first sound device including a plurality of first speakers and a plurality of first microphones, and a second sound device including a plurality of second speakers and a plurality of second microphones. The first sound device includes: a device detector that detects the second sound device connected to a network; a test audio transmitter/receiver that acquires, via the plurality of first microphones, test audio output from the plurality of second speakers; a speaker sound source localizer that performs sound source localization with respect to the plurality of second speakers based on the test audio acquired by the test audio transmitter/receiver; a position calculator that calculates positions of the plurality of second speakers relative to the first sound device; and a position notifier that notifies the second sound device of position information representing the positions calculated by the position calculator.

7 Claims, 9 Drawing Sheets

(56) References Cited

U.S. PATENT DOCUMENTS

| | | | | |
|---|---|---|---|---|
| 2009/0052688 A1* | 2/2009 | Ishibashi | ............... | H04R 1/406 |
| | | | | 381/92 |
| 2009/0123007 A1* | 5/2009 | Katayama | ............... | H04S 7/302 |
| | | | | 381/300 |
| 2011/0091055 A1* | 4/2011 | LeBlanc | ............... | H04S 7/301 |
| | | | | 381/303 |
| 2011/0268285 A1* | 11/2011 | Ohta | ............... | G01S 3/808 |
| | | | | 381/58 |
| 2012/0288124 A1* | 11/2012 | Fejzo | ............... | H04S 7/303 |
| | | | | 381/303 |
| 2013/0170658 A1* | 7/2013 | Fujisawa | ............... | H04R 29/00 |
| | | | | 381/58 |
| 2015/0264508 A1* | 9/2015 | Reilly | ............... | G01S 3/80 |
| | | | | 381/303 |
| 2015/0312690 A1* | 10/2015 | Yuyama | ............... | H04R 29/002 |
| | | | | 381/59 |
| 2017/0201825 A1* | 7/2017 | Whyte | ............... | H04N 7/15 |
| 2017/0230753 A1* | 8/2017 | Friedlander | ............... | H04R 5/04 |
| 2019/0306642 A1* | 10/2019 | Ayotte | ............... | H04S 7/303 |
| 2020/0015002 A1* | 1/2020 | Usui | ............... | H04R 1/227 |

* cited by examiner

SOUND SYSTEM

INCORPORATION BY REFERENCE

This application is based upon and claims the benefit of priority from the corresponding Japanese Patent Application No. 2018-159099 filed on Aug. 28, 2018, the entire contents of which are incorporated herein by reference.

BACKGROUND

The present disclosure relates to a sound system including a plurality of sound devices (microphone array speaker systems).

A sound system, in which the position of a sound source such as a speaking person is specified to appropriately acquire the audio output from the sound source, is known. Conventionally, a technique is proposed in which a plurality of microphones that acquire audio spoken by a speaking person are disposed in a specified direction, and an angle formed between the direction in which the speaking person has spoken toward the microphones, and the direction in which the microphones are disposed, are calculated based on the audio acquired by the microphones.

In recent years, a microphone array speaker system which is provided with a plurality of microphones and speakers and realizes an audio conference system or the like is proposed. If a plurality of microphone array speaker systems (sound devices) is installed in an open space or the like, it is possible that the sound collection areas corresponding to the sound devices may overlap. For example, a portion of the sound collection area of a first sound device and a portion of the sound collection area of a second sound device may overlap. In this case, if a speaking person located in the overlapping sound collection area speaks toward the first sound device, the audio is appropriate for the first sound device, whereas it becomes unnecessary audio (noise) for the second sound device. Consequently, it becomes necessary to grasp the positional relationship between a plurality of sound devices, and to specify the overlapping sound collection areas.

An object of the present disclosure is to provide a sound system capable of grasping the positional relationship between a plurality of sound devices.

A sound system according to an aspect of the present disclosure is provided with a first sound device including a first speaker and a first microphone, and a second sound device including a second speaker and a second microphone, wherein the first sound device includes: a first device detector that detects the second sound device connected to a network; a first audio acquirer that acquires, via the first microphone, first audio output from the second speaker; a first sound source localizer that performs sound source localization with respect to the second speaker based on the first audio acquired by the first audio acquirer; a first position calculator that calculates a first position of the second speaker relative to the first sound device; and a first position notifier that notifies the second sound device of first position information representing the first position calculated by the first position calculator.

According to the present disclosure, the positional relationship between a plurality of sound devices can be grasped.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereunder, an embodiment of the present disclosure will be described with reference to the attached drawings. The embodiment below describes an example where the present disclosure has been implemented, and does not have the property of limiting the technical scope of the present disclosure.

Figure 1:
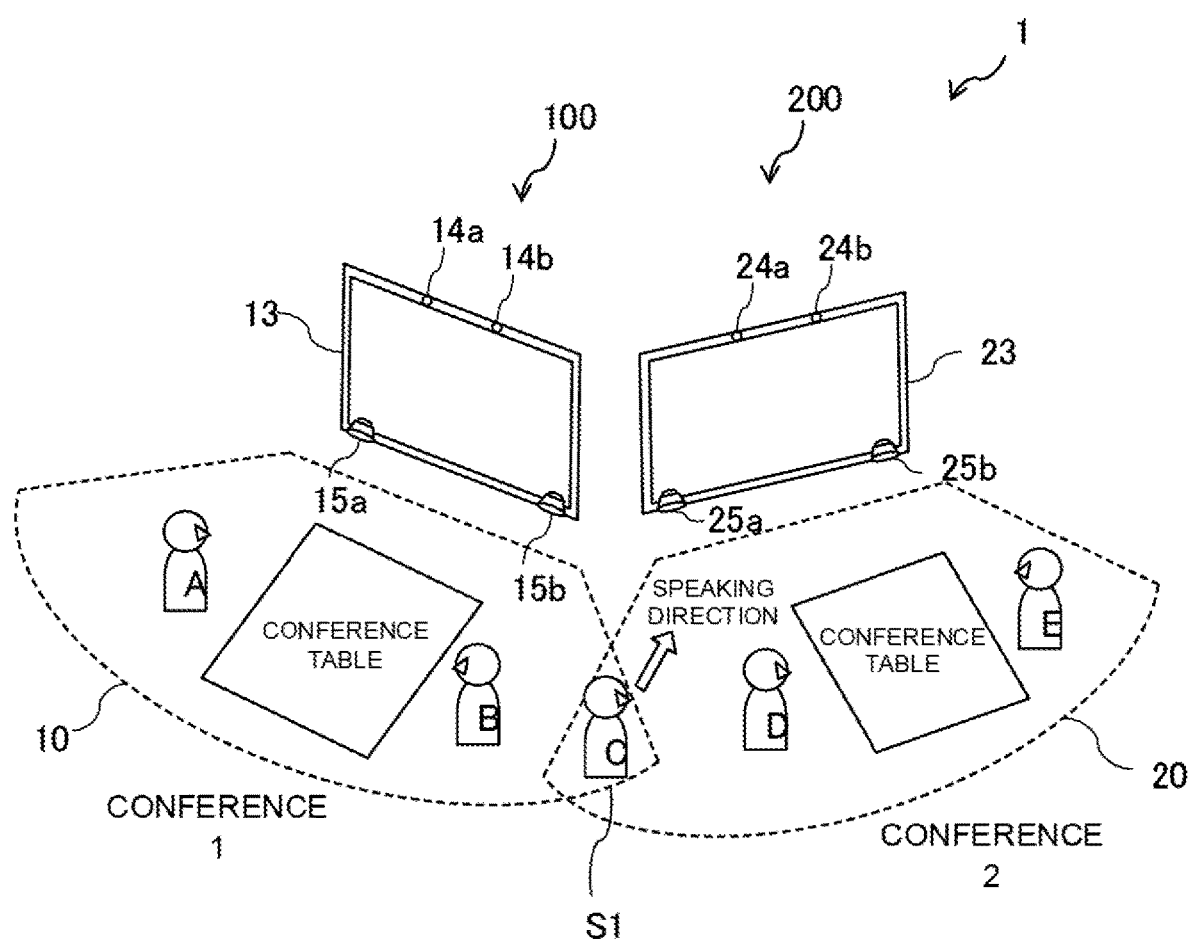
FIG. 1 is a diagram schematically showing a conference system to which a sound system according to an embodiment of the present disclosure is applied.

The sound system according to the present disclosure is, for example, applied to a conference system installed in an open space in an office. FIG. 1 schematically shows an example of the conference system. The sound system 1 includes a sound device 100 and a sound device 200, each of which constitutes a microphone array speaker system. Two or more sound devices are included in the sound system 1. Here, the two sound devices 100 and 200 are shown as an example. In the sound system 1, a sound collection area 10 is set to the sound device 100, and a sound collection area 20 is set to the sound device 200 by a beam-forming technique. The sound devices 100 and 200 acquire the audio generated in the respectively set sound collection areas 10 and 20. In the example shown in FIG. 1, participants A and B in conference 1 perform conferencing using the sound device 100, and participants C, D, and E in conference 2 perform conferencing using the sound device 200. Each conference may be a conference involving only these participants, or may be a video conference that includes outside participants.

The sound device 100 includes an operation display unit 13, at least two microphones 14, and at least one speaker 15. In FIG. 1, two microphones 14a and 14b and two speakers 15a and 15b are shown as an example. The microphones 14a and 14b are disposed in an upper portion of the operation display unit 13 with a predetermined spacing. The speakers 15a and 15b are disposed in a lower portion of the operation display unit 13 with a predetermined spacing. The microphones 14a and 14b collect the audio spoken by participants A and B in conference 1. The speakers 15a and 15b output the audio spoken by outside participants which are participating in a video conference in conference 1, and output the audio of audio data stored or acquired by the sound device 100. The operation display unit 13 displays materials relating to conference 1, video of the participants in conference 1, images and the like stored or acquired by the sound device 100, and the like. The microphones 14a and 14b are an example of a first microphone of the present disclosure. The speakers 15a and 15b are an example of a first speaker of the present disclosure. The operation display unit 13 is an example of a first display of the present disclosure.

Similarly, the sound device 200 includes an operation display unit 23, at least two microphones 24, and at least one speaker 25. In FIG. 1, two microphones 24a and 24b and two speakers 25a and 25b are shown as an example. The microphones 24a and 24b are disposed in an upper portion of the operation display unit 23 with a predetermined spacing. The speakers 25a and 25b are disposed in a lower portion of the operation display unit 23 with a predetermined spacing. The microphones 24a and 24b collect the audio spoken by participants C, D, and E in conference 2. The speakers 25a and 25b output the audio spoken by outside participants which are participating in a video conference in conference 2, and output the audio of audio data stored or acquired by the sound device 200. The operation display unit 23 displays materials relating to conference 2, video of the participants in conference 2, images and the like stored or acquired by the sound device 200, and the like. The microphones 24a and 24b are an example of a second microphone of the present disclosure. The speakers 25a and 25b are an example of a second speaker of the present disclosure. The operation display unit 23 is an example of a second display of the present disclosure.

Here, in the example shown in FIG. 1, a portion of the sound collection area 10 of the sound device 100 and a portion of the sound collection area 20 of the sound device 200 are overlapping. Furthermore, participant C in conference 2 is present inside the overlapping area (overlapping area S1). In this case, if participant C speaks toward the sound device 200, the microphones 24a and 24b collect the audio of participant C, and the sound device 200 acquires the audio. On the other hand, the microphones 14a and 14b also collect the audio of participant C, and the sound device 100 acquires the audio. The audio acquired by the sound device 200 is appropriate audio, which is related to conference 2. However, the audio acquired by the sound device 100 is inappropriate audio (noise), which is unrelated to conference 1.

As described above, in a sound system in which a plurality of sound collection areas are configured, and whose sound collection areas overlap, a problem may arise in which one of the sound devices collects audio that represents noise. As a method of solving this problem, removal of the audio that represents noise by grasping the positional relationship between the plurality of sound devices, and the like, may be considered. In the first embodiment below, a configuration that grasps the positional relationship between the plurality of sound devices will be described. Further, in the second embodiment, a configuration that removes (by filter processing) the audio that represents noise will be described.

First Embodiment

Figure 2:
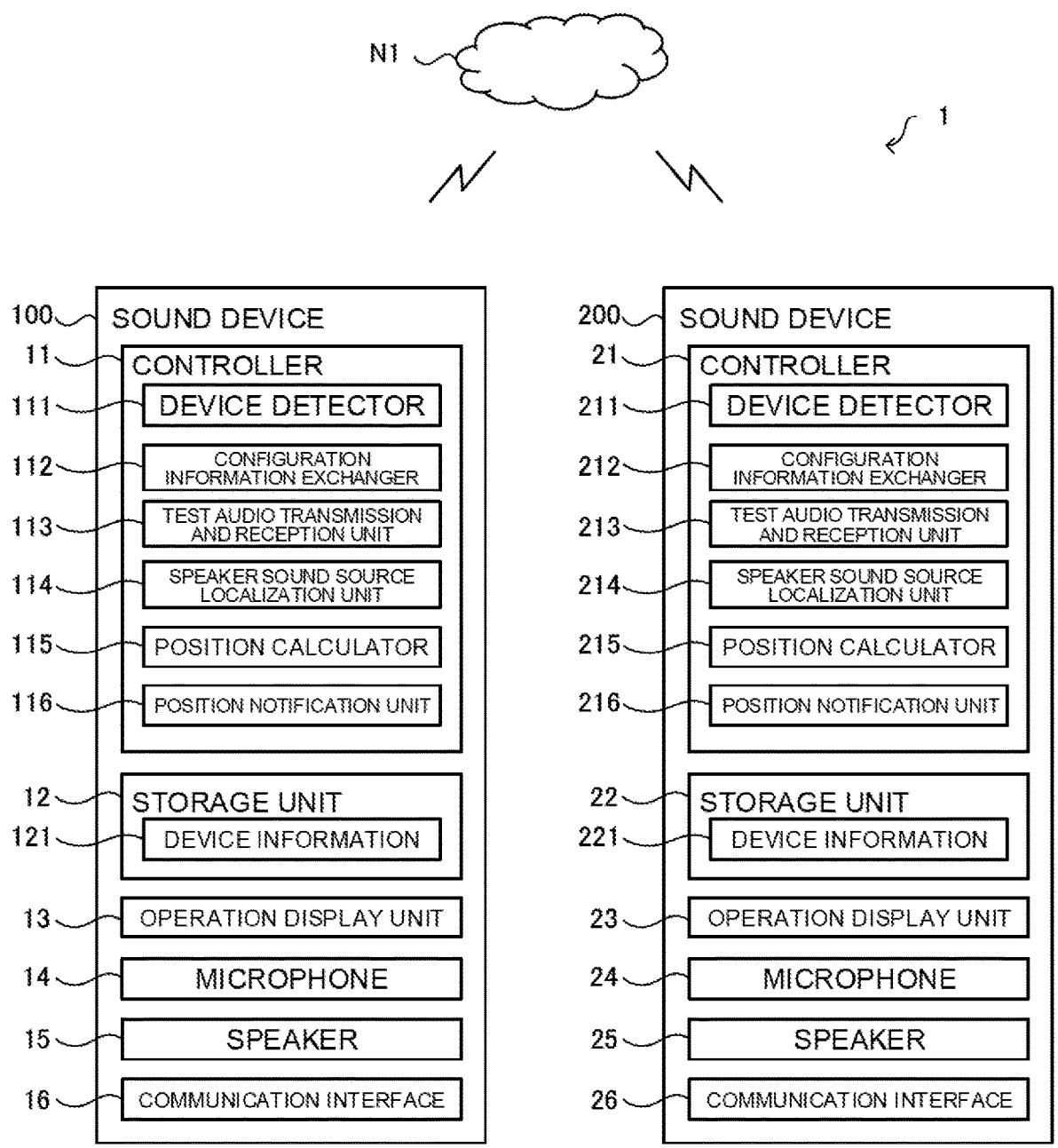
FIG. 2 is a functional block diagram showing a configuration of a sound system according to a first embodiment of the present disclosure.

FIG. 2 is a diagram showing a schematic configuration of a sound system 1 according to a first embodiment of the present disclosure. The sound devices 100 and 200 are respectively connected to a network N1, and are capable of communicating with external devices. The network N1 is a communication network such as the Internet, a LAN, a WAN, or a public telephone line. For example, the sound devices 100 and 200 respectively construct a video conference system by using the network N1.

Sound Device 100

As shown in FIG. 2, the sound device 100 includes a controller 11, a storage unit 12, an operation display unit 13, a microphone 14, a speaker 15, a communication interface 16, and the like. The sound device 100 may be, for example, a display device, or an information processing device such as a personal computer. The sound device 100 is an example of a first sound device of the present disclosure.

The communication interface 16 connects the sound device 100 to the network N1 in a wired or wireless fashion, and is a communication interface for executing data communication with another external device (such as the sound device 200) via the network N1 according to a predetermined communication protocol.

The speaker 15 includes two speakers 15a and 15b disposed in a lower portion of the operation display unit 13 with a predetermined spacing (see FIG. 1). The speakers 15a and 15b each output audio to the outside. The speakers 15a and 15b are evenly disposed to the left and right of the center of the sound device 100.

The microphone 14 includes two microphones 14a and 14b disposed in an upper portion of the operation display unit 13 with a predetermined spacing (see FIG. 1). The microphones 14a and 14b each collect audio. The microphones 14a and 14b are evenly disposed to the left and right of the center of the sound device 100.

The operation display unit 13 is a user interface provided with a display unit such as a liquid crystal display or an organic EL display that displays various information, and an operation unit such as a mouse, a keyboard, or a touch panel that accepts operations.

The storage unit 12 is a non-volatile storage unit including a semiconductor memory, a hard disk drive (HDD), a solid state drive (SSD), or the like that stores various information. For example, the storage unit 12 stores a control program, such as a position detection processing program for causing the controller 11 to execute position detection processing described below (see FIG. 5 and FIG. 6). For example, the position detection processing program is non-temporarily recorded on a computer-readable recording medium such as a USB, a CD, or a DVD (each are registered trademarks), and is stored in the storage unit 12 by being read by a reading device (not shown) such as a USB drive, a CD drive, or a DVD drive which is electrically connected to the sound device 100. The position detection processing program may be stored in the storage unit 12 by being downloaded from an external device via the network N1.

Furthermore, the storage unit 12 stores device information 121 of the sound device 100. The device information 121 includes Universally Unique Identifier (UUID) information representing specific information that identifies the sound device 100, and configuration information representing information relating to the components that constitute the sound device 100. The configuration information includes placement information, such as distances and angles, of the microphones 14a and 14b and the speakers 15a and 15b inside the sound device 100. The storage unit 12 is an example of a first storage of the present disclosure.

The controller 11 includes control components such as a CPU, a ROM, and a RAM. The CPU is a processor that executes various arithmetic processing. The ROM is a non-volatile storage unit in which control programs, such as a BIOS and OS for causing the CPU to execute various arithmetic processing, are stored in advance. The RAM is a volatile or non-volatile storage unit that stores various information, and is used as a temporary storage memory (working area) of the various processing executed by the CPU. Further, the controller 11 controls the sound device 100 by executing the various control programs stored in advance in the ROM or in the storage unit 12.

Specifically, the controller 11 includes various processing units, such as a device detector 111, a configuration information exchanger 112, a test audio transmission and reception unit 113, a speaker sound source localization unit 114, a position calculator 115, and a position notification unit 116. The controller 11 functions as various processing units as a result of the CPU executing various processing according to the position detection processing program. Furthermore, some or all of the processing units included in the controller 11 may be constituted by an electronic circuit. The position detection processing program may be a program for causing a plurality of processors to function as the various processing units.

The device detector 111 detects other sound devices (here, the sound device 200) connected to the network N1. The device detector 111 is an example of a first device detector of the present disclosure. For example, the device detector 111 automatically recognizes the sound device 200 by means of a Universal Plug and Play (UPNP) function. Furthermore, the device detector 111 may recognize the sound device 200 by embedding UUID information in audio data outside the audible range, and periodically outputting the data. A known method may be employed as the method by which the device detector 111 detects other sound devices.

The configuration information exchanger 112 exchanges configuration information with the other sound device 200 detected by the device detector 111. For example, the configuration information exchanger 112 transmits, to the sound device 200, the distances and angles relating to the microphones 14a and 14b and the speakers 15a and 15b inside sound device 100 (first configuration information), and receives, from the sound device 200, the distances and angles relating to the microphones 24a and 24b and the speakers 25a and 25b inside the sound device 200 (second configuration information).

The test audio transmission and reception unit 113 acquires test audio output from the speakers 25a and 25b of the other sound device 200 detected by the device detector 111. The test audio transmission and reception unit 113 is an example of a first audio acquirer of the present disclosure. Furthermore, the test audio transmission and reception unit 113 outputs test audio from the speakers 15a and 15b of the sound device 100. The test audio is audio for specifying the positional relationship between the sound devices 100 and 200. For example, audio outside the audible range which includes UUID information may be used. Here, if the sound device 100 serves as a master device and the sound device 200 serves as a slave device, the test audio transmission and reception unit 113 transmits an instruction (audio output instruction) to the sound device 200 that causes test audio to be output from the speakers 25a and 25b.

The speaker sound source localization unit 114 performs, based on the test audio acquired by the test audio transmission and reception unit 113, audio localization with respect to the speakers 25a and 25b of the sound device 200, which is the sound source of the test audio. For example, the speaker sound source localization unit 114 performs sound source localization with respect to the speaker 25a based on the configuration information (distances and angles) of the two microphones 14a and 14b that collect the test audio output from the speaker 25a, and the configuration information (distances and angles) of the speaker 25a. Furthermore, the speaker sound source localization unit 114 performs sound source localization with respect to the speaker 25b based on the configuration information (distances and angles) of the two microphones 14a and 14b that collect the test audio output from the speaker 25b, and the configuration information (distances and angles) of the speaker 25b. The speaker sound source localization unit 114 is an example of a first sound source localizer of the present disclosure.

The position calculator 115 calculates the positions (distances and angles) of the speakers 25a and 25b with respect to the sound device 100 based on the distances and angles of the speakers 25a and 25b acquired by the configuration information exchanger 112, and the sound source localization result from the speaker sound source localization unit 114. The position calculator 115 is an example of a first position calculator of the present disclosure.

Figure 3:
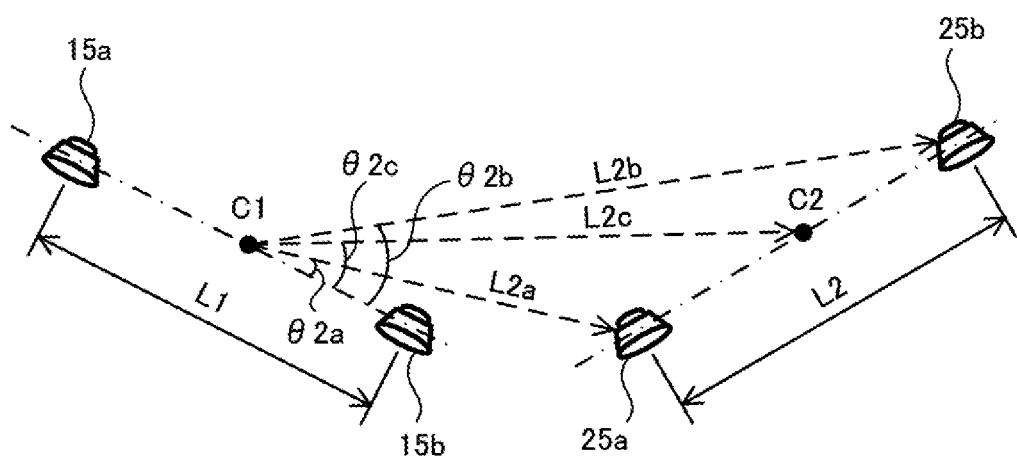
FIG. 3 is a diagram schematically showing the positional relationship between the speakers of each sound device in the sound system according to the first embodiment of the present disclosure.

FIG. 3 schematically shows the positional relationship between the sound device 100 and the speakers 25a and 25b of the sound device 200. A distance L1 between the speakers 15a and 15b, and position information of the speakers 15a and 15b with respect to a center C1 of the sound device 100 are included in the placement information of the configuration information of the sound device 100. Furthermore, a distance L2 between the speakers 25a and 25b, and position information of the speakers 25a and 25b with respect to a center C2 of the sound device 200 are included in the placement information of the configuration information of the sound device 200.

As shown in FIG. 3, the position calculator 115 calculates, based on the placement information of the speakers 25a and 25b and the sound source localization result, a distance L2a and an angle θ2a of the speaker 25a with respect to the center C1 of the sound device 100, and a distance L2b and an angle θ2b of the speaker 25b with respect to the center C1 of the sound device 100. Furthermore, the position calculator 115 calculates, based on the configuration information of the sound device 200 and the sound source localization result, a distance L2c and an angle θ2c of the sound device 200 with respect to the center C1 of the sound device 100.

The position notification unit 116 notifies the sound device 200 of the information (first position information) relating to the distances and angles calculated by the position calculator 115, that is to say, information relating to the distance L2a and the angle θ2a of the speaker 25a with respect to the sound device 100, and the distance L2b and the angle θ2b of the speaker 25b with respect to the sound device 100. Furthermore, the position notification unit 116 receives information (second position information) relating to the distances and angles notified by the sound device 200 described below. The position notification unit 116 is an example of a first position notifier of the present disclosure.

Sound Device 200

As shown in FIG. 2, the sound device 200 has the same configuration and functions as the sound device 100. In the following, the description of those components having the same function as in the sound device 100 are appropriately omitted. The sound device 200 is an example of a second sound device of the present disclosure.

The storage unit 22 is a non-volatile storage unit including a semiconductor memory a hard disk drive (HDD), a solid state drive (SSD), or the like that stores various information. For example, the storage unit 22 stores a control program, such as a position detection processing program for causing the controller 21 to execute position detection processing described below (see FIG. 5 and FIG. 6). For example, the position detection processing program is non-temporarily recorded on a computer-readable recording medium such as a USB, a CD, or a DVD (each are registered trademarks), and is stored in the storage unit 22 by being read by a reading device (not shown) such as a USB drive, a CD drive, or a DVD drive which is electrically connected to the sound device 200. The position detection processing program may be stored in the storage unit 22 by being downloaded from an external device via the network N1.

Furthermore, the storage unit 22 stores device information 221 relating to the sound device 200. The device information 221 includes UUID information representing specific information that identifies the sound device 200, and configuration information representing information relating to the devices that constitute the sound device 200. The configuration information includes placement information of the microphones 24a and 24b and the speakers 25a and 25h inside the sound device 200, such as distances and angles. The storage unit 22 is an example of a second storage of the present disclosure.

The controller 21 includes various processing units such as a device detector 211, a configuration information exchanger 212, a test audio transmission and reception unit 213, a speaker sound source localization unit 214, a position calculator 215, and a position notification unit 216. The controller 21 functions as various processing units as a result of the CPU executing various processing according to the position detection processing program. Furthermore, some or all of the processing units included in the controller 21 may be constituted by an electronic circuit. The position detection processing program may be a program for causing a plurality of processors to function as the various processing units.

The device detector 211 detects other sound devices (here, the sound device 100) connected to the network N1. The device detector 211 is an example of a second device detector of the present disclosure.

The configuration information exchanger 212 exchanges configuration information with the other sound device 100 detected by the device detector 211. For example, the configuration information exchanger 212 transmits, to the sound device 100, the distances and angles relating to the microphones 24a and 24h and the speakers 25a and 25b inside sound device 200 (second configuration information), and receives, from the sound device 100, the distances and angles relating to the microphones 14a and 14b and the speakers 15a and 15b inside the sound device 100 (first configuration information).

The test audio transmission and reception unit 213 acquires test audio output from the speakers 15a and 15b of the other sound device 100 detected by the device detector 211. Furthermore, the test audio transmission and reception unit 213 outputs test audio from the speakers 25a and 25b. If the sound device 100 serves as a master device and the sound device 200 serves as a slave device, the test audio transmission and reception unit 213 outputs test audio from the speakers 25a and 25b when an audio output instruction is received from the sound device 100. The test audio includes UUID information of the sound device 200. The test audio transmission and reception unit 213 is an example of an audio outputter and a second audio acquirer of the present disclosure.

The speaker sound source localization unit 214 performs, based on the test audio acquired by the test audio transmission and reception unit 213, audio localization with respect to the speakers 15a and 15b of the sound device 100, which is the sound source of the test audio. For example, the speaker sound source localization unit 214 performs sound source localization with respect to the speaker 15a based on the configuration information (distances and angles) of the two microphones 24a and 24b that collect the test audio output from the speaker 15a, and the configuration information (distances and angles) of the speaker 15a. Furthermore, the speaker sound source localization unit 214 performs sound source localization with respect to the speaker 15b based on the configuration information (distances and angles) of the two microphones 24a and 24b that collect the test audio output from the speaker 15b, and the configuration information (distances and angles) of the speaker 15b. The speaker sound source localization unit 214 is an example of a second sound source localizes of the present disclosure.

The position calculator 215 calculates the positions (distances and angles) of the speakers 15a and 15b with respect to the sound device 200 based on the distances and angles of the speakers 15a and 15b acquired by the configuration information exchanger 212, and the sound source localization result from the speaker sound source localization unit 214. The position calculator 215 is an example of a second position calculator of the present disclosure.

Figure 4:
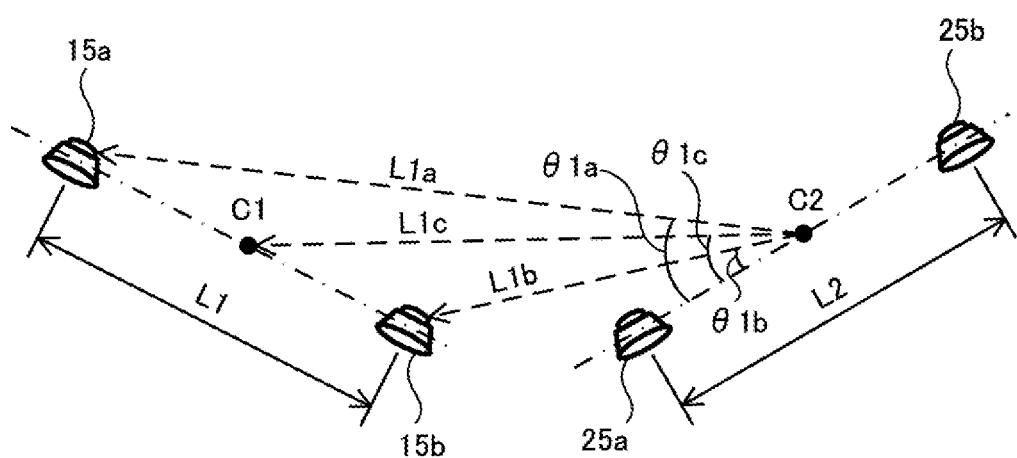
FIG. 4 is a diagram schematically showing the positional relationship between the speakers of each sound device in the sound system according to the first embodiment of the present disclosure.

FIG. 4 schematically shows the positional relationship between the speakers 15a and 15b of the sound device 100 and the sound device 200. As shown in FIG. 4, the position calculator 215 of the sound device 200 calculates, based on the placement information of the speakers 15a and 15b and the sound source localization result, a distance L1a and an angle θ1a of the speaker 15a with respect to the center C2 of the sound device 200, and a distance Lib and an angle θ1b of the speaker 15b with respect to the center C2 of the sound device 200. Furthermore, the position calculator 215 calculates, based on the configuration information of the sound device 100 and the sound source localization result, a distance L1c and an angle θ1c of the sound device 100 with respect to the center C2 of the sound device 200.

The position notification unit 216 notifies the sound device 100 of the information (second position information) relating to the distances and angles calculated by the position calculator 215, that is to say, information relating to the distance L1a and the angle θ1a of the speaker 15a with respect to the sound device 200, and the distance Lib and the angle θ1b of the speaker 15b with respect to the sound device 200. Furthermore, the position notification unit 216 receives the first position information notified by the sound device 100. The position notification unit 216 is an example of a position receiver and a second position notifier of the present disclosure.

The sound devices 100 and 200 are capable of grasping the positional relationship between the sound devices 100 and 200 by exchanging the position information calculated in each device.

Position Detection Processing

Hereinafter, an example of a position detection processing sequence executed by the controller 11 of the sound device 100 will be described with reference to FIG. 5.

In step S101, the controller 11 (device detector 111) detects other sound devices (here, the sound device 200) connected to the network N1. If the sound device 200 is detected (S101: YES), the processing proceeds to step S102.

In step S102, if the sound device 100 has become a master device (S102: YES), the processing proceeds to step S103. If the sound device 100 has become a slave device (step S102: NO), the sound device 100 executes the processing described below (see FIG. 6). A known method may be employed as the method of assigning a sound device as the master device or the slave device. Here, it is assumed that the sound device 100 serves as the master device, and the sound device 200 serves as the slave device.

In step S103, the controller 11 (configuration information exchanger 112) exchanges configuration information with the sound device 200. Specifically, the controller 11 transmits, to the sound device 200, placement information (distances and angles) relating to the microphones 14a and 14b and the speakers 15a and 15h inside the sound device 100, and receives, from the sound device 200, placement information (distances and angles) relating to the microphones 24a and 24b and the speakers 25a and 25b inside the sound device 200.

In step S104, the controller 11 (test audio transmission and reception unit 113) instructs (audio output instruction) the sound device 200 serving as the slave device to output test audio from the speakers 25a and 25b. If the controller 11 (test audio transmission and reception unit 113) acquires the test audio output by the speakers 25a and 25b via the microphones 14a and 14b (S105: YES), the processing proceeds to step S106. If the controller 11 is unable to acquire the test audio (S105: NO), the processing proceeds to step S110.

In step S106, if the controller 11 (speaker sound source localization unit 114) has completed sound source localization with respect to one of the speakers (for example, the speaker 25a) based on the test audio (S106: YES), the processing proceeds to step S107. If the controller 11 was unable to complete sound source localization with respect to the speaker 25a based on the test audio (S106: NO), the processing proceeds to step S110.

In step S107, if other speakers exist for which sound source localization has not been completed (S107: YES), the processing returns to step S105. If no other speakers exist for which sound source localization has not been completed (S107: NO), the processing proceeds to step S108. Here, because another speaker 25b exists, the processing returns to step S105, and the processing above is repeated. When sound source localization with respect to the speakers 25a and 25h is completed, the processing proceeds to step S108.

In step S108, the controller 11 (position calculator 115) calculates the positions (distances and angles) of the speakers 25a and 25b with respect to the sound device 100 based on the placement information (distances and angles) of the speakers 25a and 25b, and the sound source localization result from the speaker sound source localization unit 114.

In step S109, the controller 11 (position notification unit 116) notifies the sound device 200 of information (position information) which includes the distance L2a and the angle θ2a of the speaker 25a with respect to the sound device 100, and the distance L2b and the angle θ2b of the speaker 25b with respect to the sound device 100.

In step S110, the controller 11 sets information (such as a flag) indicating that the position detection processing has already been executed with respect to the sound device 200.

Then, the processing returns to step S101, and detection processing is performed with respect to another sound device.

Hereinafter, an example of a position detection processing sequence executed by the controller 21 of the sound device 200 serving as the slave device will be described with reference to FIG. 6.

In step S201, the controller 21 (device detector 211) detects other sound devices (here, the sound device 100) connected to the network N1. If the sound device 100 is detected (S201: YES), the processing proceeds to step S202. In step S202, if the sound device 200 has not become a master device (S202: NO), that is to say, has become a slave device, the processing proceeds to step S203. If the sound device 200 has become the master device (step S202: NO), the sound device 200 executes the processing described above (see FIG. 5). Here, because it is assumed that the sound device 100 serves as the master device, and the sound device 200 serves as the slave device, and the processing proceeds to step S203.

In step S203, the controller 21 (configuration information exchanger 212) exchanges configuration information with the sound device 100. Specifically, the controller 21 transmits, to the sound device 100, placement information (distances and angles) relating to the microphones 24a and 24b and the speakers 25a and 25b inside the sound device 200, and receives, from the sound device 100, placement information (distances and angles) relating to the microphones 14a and 14b and the speakers 15a and 15b inside the sound device 100.

In step S204, if the controller 21 (test audio transmission and reception unit 213) has received the audio output instruction from the sound device 100 (S204: YES), the processing proceeds to step S205.

In step S205, the controller 21 (test audio transmission and reception unit 213) outputs test audio from the speakers 25a and 25b.

In step S206, if sound source localization with respect to the speakers 25a and 25b was completed in the sound device 100 (S206: YES), the processing proceeds to step S207. If the sound source localization was not completed (S206: NO), the processing proceeds to step S204.

In step S207, the controller 21 (position notification unit 216) receives the position information transmitted from the sound device 100, that is to say, information which includes the distance L2a and the angle θ2a of the speaker 25a with respect to the sound device 100, and the distance L2b and the angle θ2b of the speaker 25b with respect to the sound device 100.

After the sound devices 100 and 200 have each executed the position detection processing described above (see FIG. 5 and FIG. 6), the sound device 100 executes "process 2" enclosed by the dotted frame in FIG. 6, and the sound device 200 executes "process 1" enclosed by the dotted frame in FIG. 5. Consequently, the sound devices 100 and 200 grasp the positions (distances and angles) of the sound sources (speakers) of the other sound device with respect to itself. Therefore, the positional relationship between the sound devices 100 and 200 can be grasped.

Second Embodiment

Figure 7:
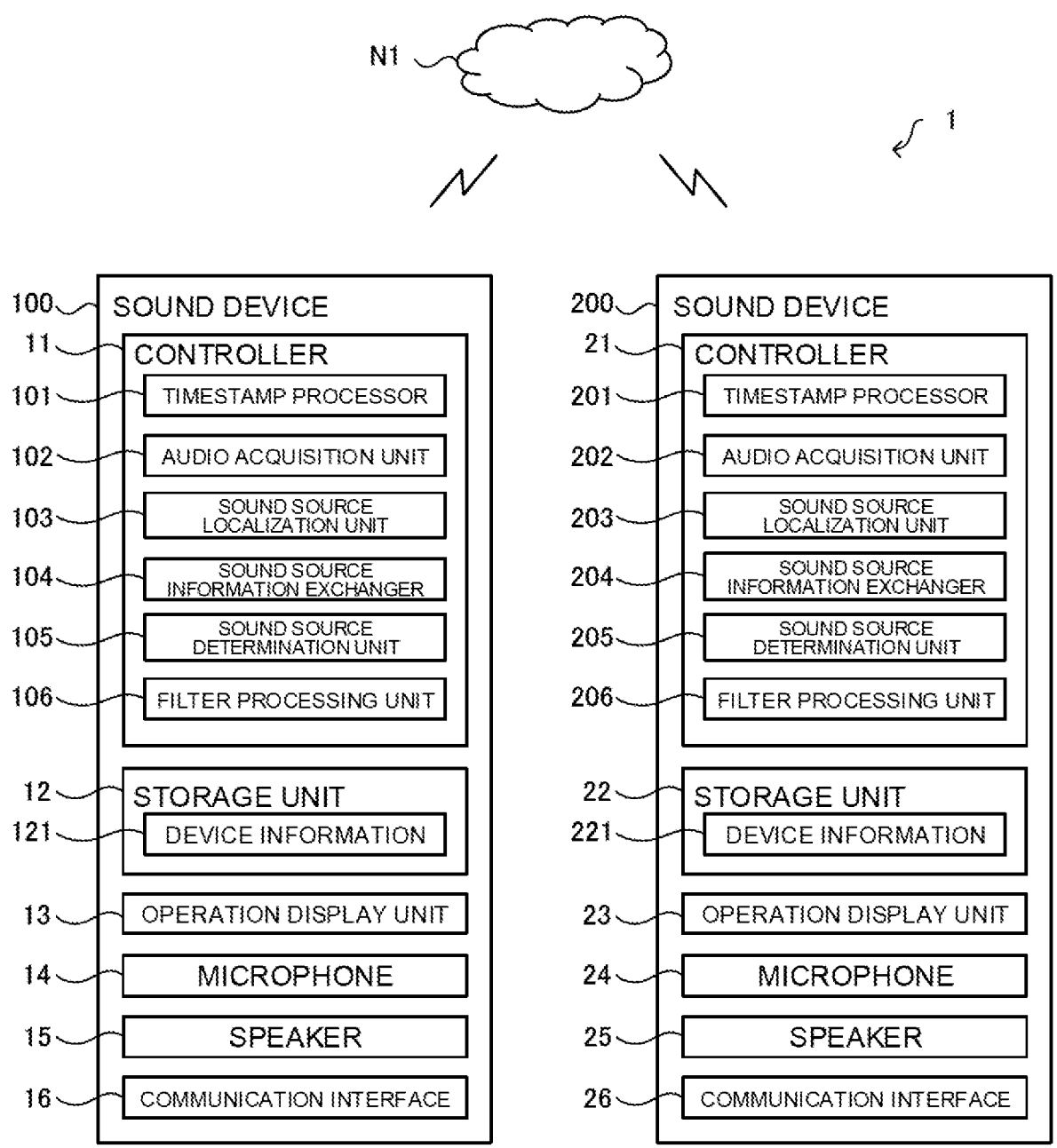
FIG. 7 is a functional block diagram showing a configuration of a sound system according to a second embodiment of the present disclosure.

FIG. 7 is a diagram showing a schematic configuration of a sound system 1 according to a second embodiment of the present disclosure. The description of configurations that are the same as those in the sound system 1 according to the first embodiment are omitted. The sound devices 100 and 200 have the same configuration and functions. Hereinafter, a description of the sound device 100 is presented as an example.

The storage unit 12 of the sound device 100 is a non-volatile storage unit including a semiconductor memory, a hard disk drive (HDD), a solid state drive (SSD), or the like that stores various information. For example, the storage unit 12 stores a control program, such as a sound source filter processing program for causing the controller 11 to execute sound source filter processing as described below (see FIG. 8). For example, the sound source filter processing program is non-temporarily recorded on a computer-readable recording medium such as a USB, a CD, or a DVD (each are registered trademarks), and is stored in the storage unit 12 by being read by a reading device (not shown) such as a USB drive, a CD drive, or a DVD drive which is electrically connected to the sound device 100. The sound source filter processing program may be stored in the storage unit 12 by being downloaded from an external device via the network N1.

As shown in FIG. 7, the controller 11 of the sound device 100 includes, in addition to the processing units shown in FIG. 2, various processing units such as a timestamp processor 101, an audio acquisition unit 102, a sound source localization unit 103, a sound source information exchanger 104, a sound source determination unit 105, and a filter processing unit 106. The controller 11 functions as the various processing units as a result of the CPU executing various processing according to the sound source filter processing program. Furthermore, some or all of the processing units included in the controller 11 may be constituted by an electronic circuit. The sound source filter processing program may be a program for causing a plurality of processors to function as the various processing units.

The timestamp processor 101 performs timestamp corrections and the like to achieve synchronization with other sound devices (here, the sound device 200).

Figure 5:
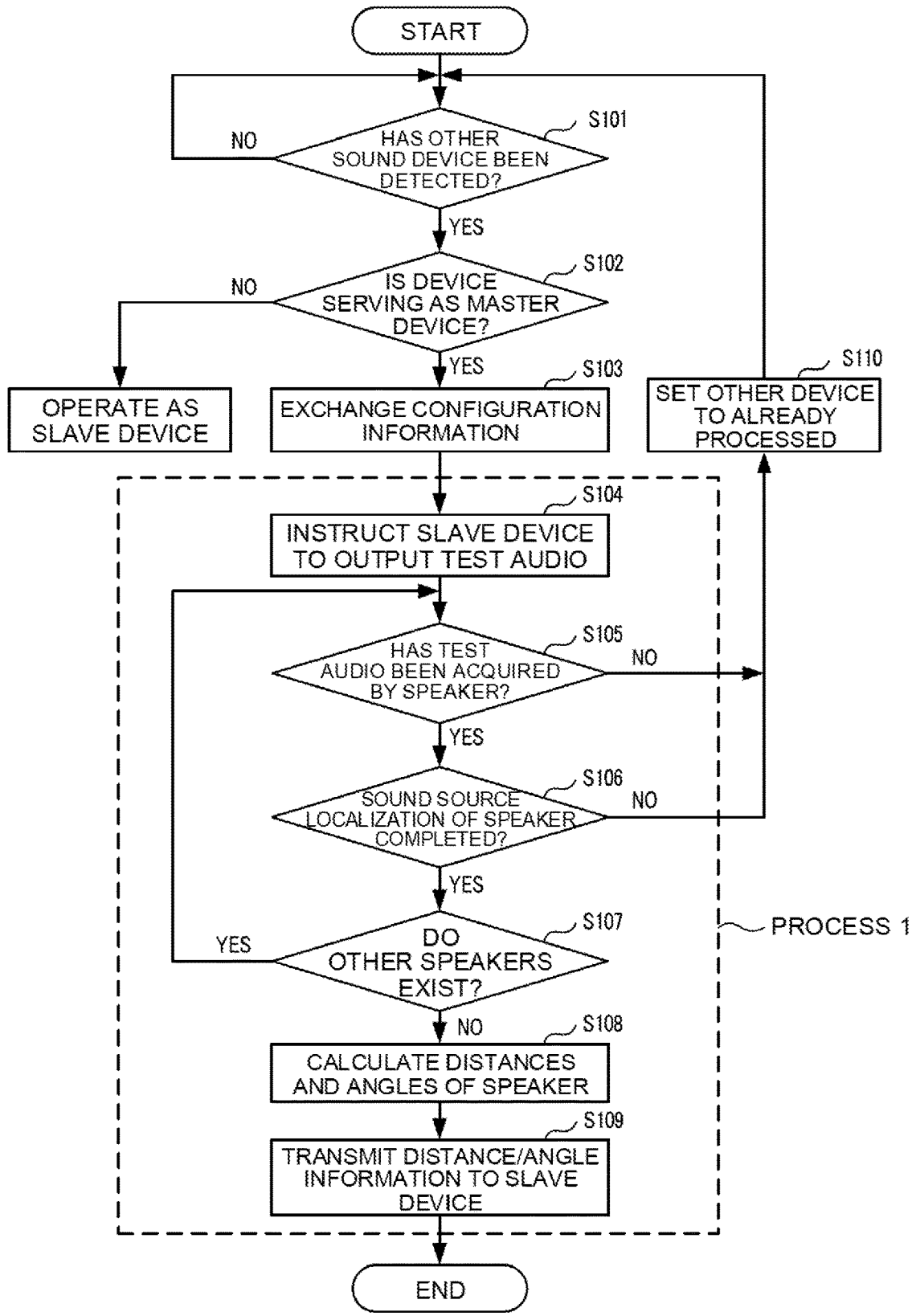
FIG. 5 is a flowchart for describing an example of a position detection processing sequence in the sound system according to the first embodiment of the present disclosure.
Figure 6:
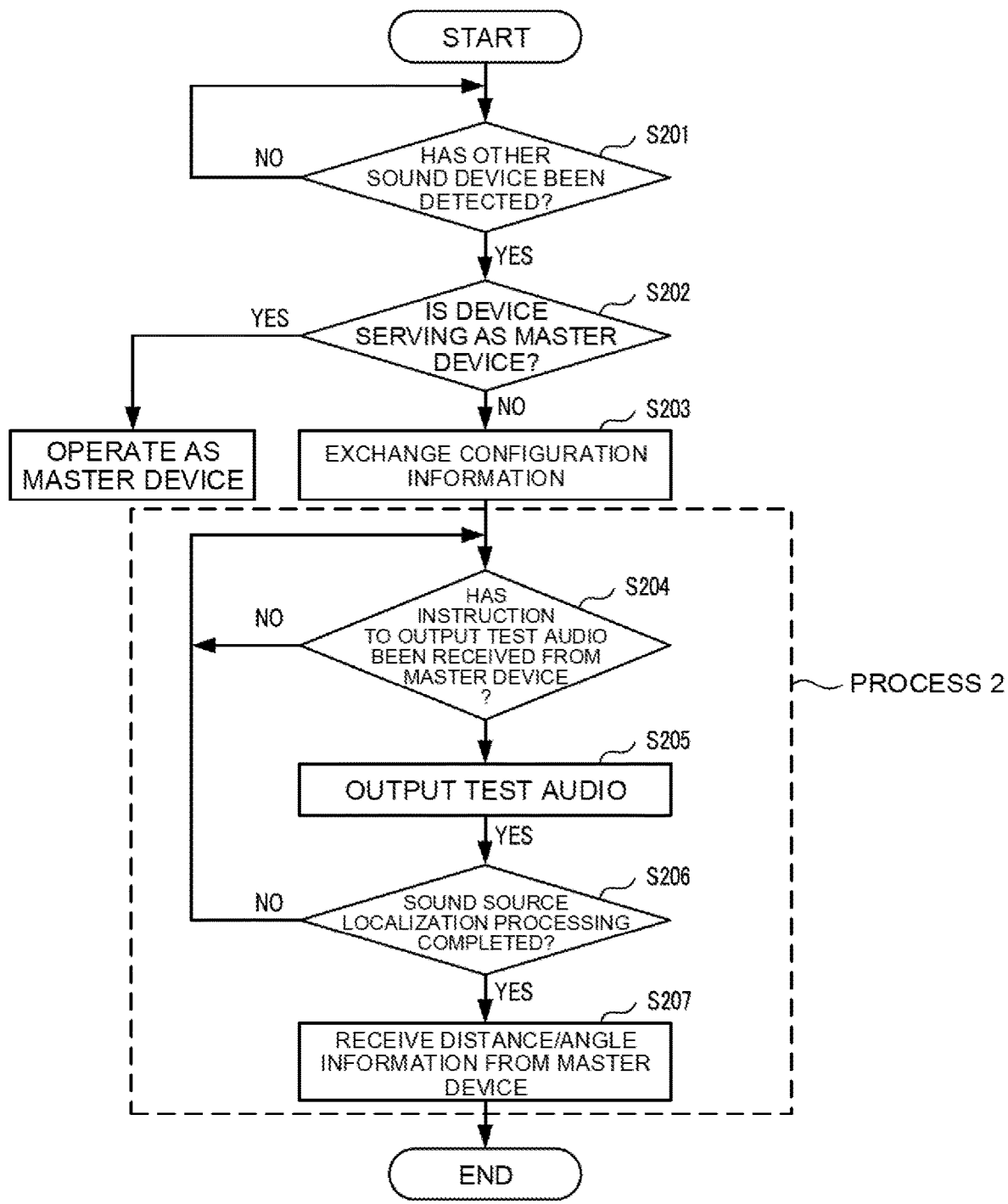
FIG. 6 is a flowchart for describing an example of a position detection processing sequence in the sound system according to the first embodiment of the present disclosure.

The audio acquisition unit 102 acquires audio of a speaking person collected by the microphones 14a and 14b after construction of the sound system 1 as a result of position detection processing (see FIG. 5 and FIG. 6). For example, in the conference system shown in FIG. 1, the audio acquisition unit 102 acquires the audio spoken by participants A and B in conference 1, who are located in the sound collection area 10. Furthermore, the audio acquisition unit 102 acquires the audio spoken by participant C in conference 2, who is located in the overlapping area S1. The controller 11 performs predetermined audio processing with respect to the audio of participants A and B acquired by the audio acquisition unit 102. For example, in a video conference system, the controller 11 transmits the audio data of the audio of participants A and B to a remote external device via the network N1. The audio acquisition unit 102 is an example of an audio acquirer of the present disclosure.

The sound source localization unit 103 performs sound source localization with respect to audio which is based on the audio acquired by the audio acquisition unit 102. Furthermore, the sound source localization unit 103 measures, based on the audio, a sound pressure level, a spectrum, or the like. The sound source localization unit 103 is an example of a sound source localizer of the present disclosure.

The sound source information exchanger 104 exchanges sound source information with other sound devices (here, the sound device 200). For example, the sound source information exchanger 104 transmits, to the sound device 200, sound source information including the sound source localization result, the sound pressure level, and the spectrum and the like obtained by the sound source localization unit 103, and receives, from the sound device 200, sound source information including a sound source localization result, a sound pressure level, and a spectrum and the like obtained by a sound source localization unit 203 of the sound device 200 described below. The sound source information exchanger 104 is an example of a sound source information acquirer of the present disclosure.

The sound source determination unit 105 determines whether or not a sound source in the sound source information acquired from the sound device 200 coincides with the sound source specified by the sound source localization unit 103. If a coinciding sound source exists in the sound source information, the sound source determination unit 105 further determines whether or not the sound pressure level of the sound source in the sound source information acquired from the sound device 200 (hereinafter referred to as second sound pressure level) is higher than the sound pressure level of the sound source specified by the sound source localization unit 103 (hereinafter referred to as first sound pressure level). The sound source determination unit 105 is an example of a sound source determiner of the present disclosure.

If the second sound pressure level is higher than the first sound pressure level, the filter processing unit 106 applies filter processing with respect to the coinciding sound source. For example, the filter processing unit 106 cancels the audio acquired from the coinciding sound source by inputting, to the microphones 14a and 14b, audio having the opposite phase to that of the audio acquired from the coinciding sound source. A known method may be employed as the audio filter processing. If the second sound pressure level is lower than or equal to the first sound pressure level, the filter processing unit 106 releases the filter processing with respect to the coinciding sound source. When the filter processing is released, the controller 11 performs predetermined audio processing with respect to the audio acquired by the audio acquisition unit 102. The filter processing unit 106 is an example of a filter processor of the present disclosure.

The processing units included in the controller 21 of the sound device 200 perform the same processing as the processing units included in the controller 11 of the sound device 100.

Sound Source Filter Processing

Figure 8:
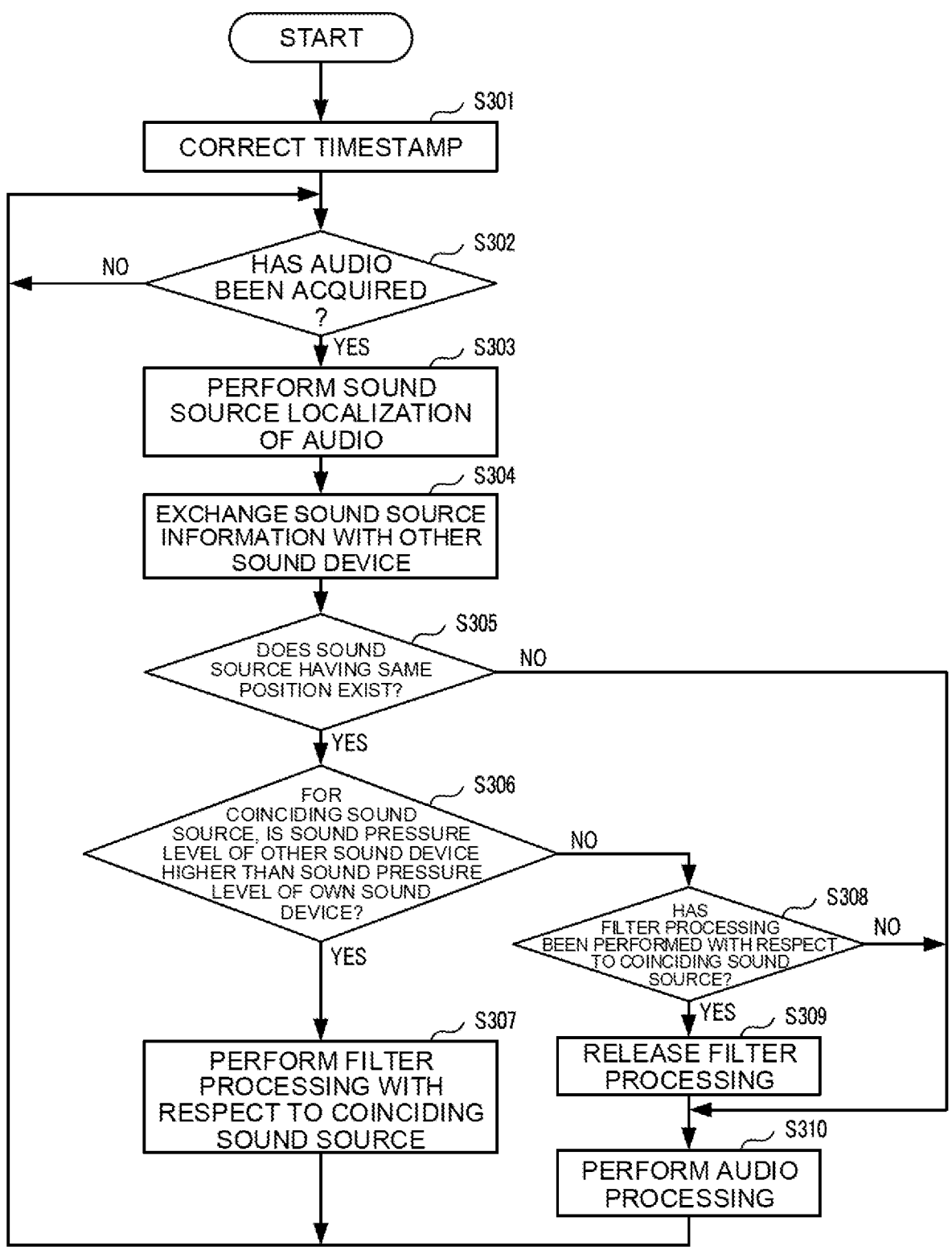
FIG. 8 is a flowchart for describing an example of an audio filter processing sequence in the sound system according to the second embodiment of the present disclosure.

Hereinafter, an example of a sound source filter processing sequence executed by the controller 11 of the sound device 100 will be described with reference to FIG. 8. The sound devices included in the sound system 1 execute the same sound source filter processing Here, an application scene in which the conference system shown in FIG. 1 is used is presented as an example.

In step S301, the controller 11 (timestamp processor 101) performs a timestamp correction to achieve synchronization with the sound device 200.

In step S302, if the controller 11 (audio acquisition unit 102) acquires audio of a speaking person (S302: YES), the processing proceeds to step S303. The controller 11 assigns a timestamp to the audio data of the acquired audio.

In step S303, the controller 11 (sound source localization unit 103) performs sound source localization based on the audio acquired by the audio acquisition unit 102.

In step S304, the controller 11 (sound source information exchanger 104) exchanges sound source information with the sound device 200.

In step S305, the controller 11 (sound source determination unit 105) determines whether or not a sound source in the sound source information acquired from the sound device 200 coincides with the sound source specified by the sound source localization unit 103. The controller 11 may use timestamp information and the like assigned to the audio data in the determination processing. If a coinciding sound source exists in the sound source information (S305: YES), for example, if a speaking person (here, participant C) is present in the overlapping area S1, the processing proceeds to step S306. If a coinciding sound source does not exist in the sound source information (S305: NO), that is to say, if a speaking person is not present in the overlapping area S1, the processing proceeds to step S310.

In step S306, the controller 11 (sound source determination unit 105) determines whether or not the sound pressure level of the sound source in the sound source information acquired from the sound device 200 (second sound pressure level) is higher than the sound pressure level of the sound source specified by the sound source localization unit 103 (first sound pressure level). If the second sound pressure level is higher than the first sound pressure level (S306: YES), the processing proceeds to step S307. If the second sound pressure level is lower than or equal to the first sound pressure level (S306: NO), the processing proceeds to step S308.

In step S307, the controller 11 (filter processing unit 106) applies filter processing with respect to the coinciding sound source. Then, the processing returns to step S302.

In step S308, the controller 11 determines whether or not filter processing has been set with respect to the coinciding sound source. If filter processing has not been set with respect to the coinciding sound source (S308: NO), the processing proceeds straight to step S310. On the other hand, if filter processing has been set with respect to the coinciding sound source (S308: YES), in step S309, the controller 11 (filter processing unit 106) releases the filter processing set with respect to the coinciding sound source. Then, the processing proceeds to step S310.

In step S310, if audio is acquired from an area other than the overlapping area S1 (S305: NO), or more specifically, if audio of participants A and B is acquired, the controller 11 executes predetermined audio processing with respect to the audio. Furthermore, if filter processing has not been set with respect to the coinciding sound source (S308: NO), or if the filter processing set with respect to the coinciding sound source has been released (S309), the controller 11 performs the predetermined audio processing. Then, the processing returns to step S302.

The sound devices execute the processing above each time audio of a speaking person is acquired. Consequently, the sound devices 100 and 200 are capable of appropriately processing original audio and removing the audio that represents noise. In this manner, with the sound system 1 according to the second embodiment, when a plurality of sound devices acquire audio of the same sound source, the audio can be appropriately processed.

Figure 9:
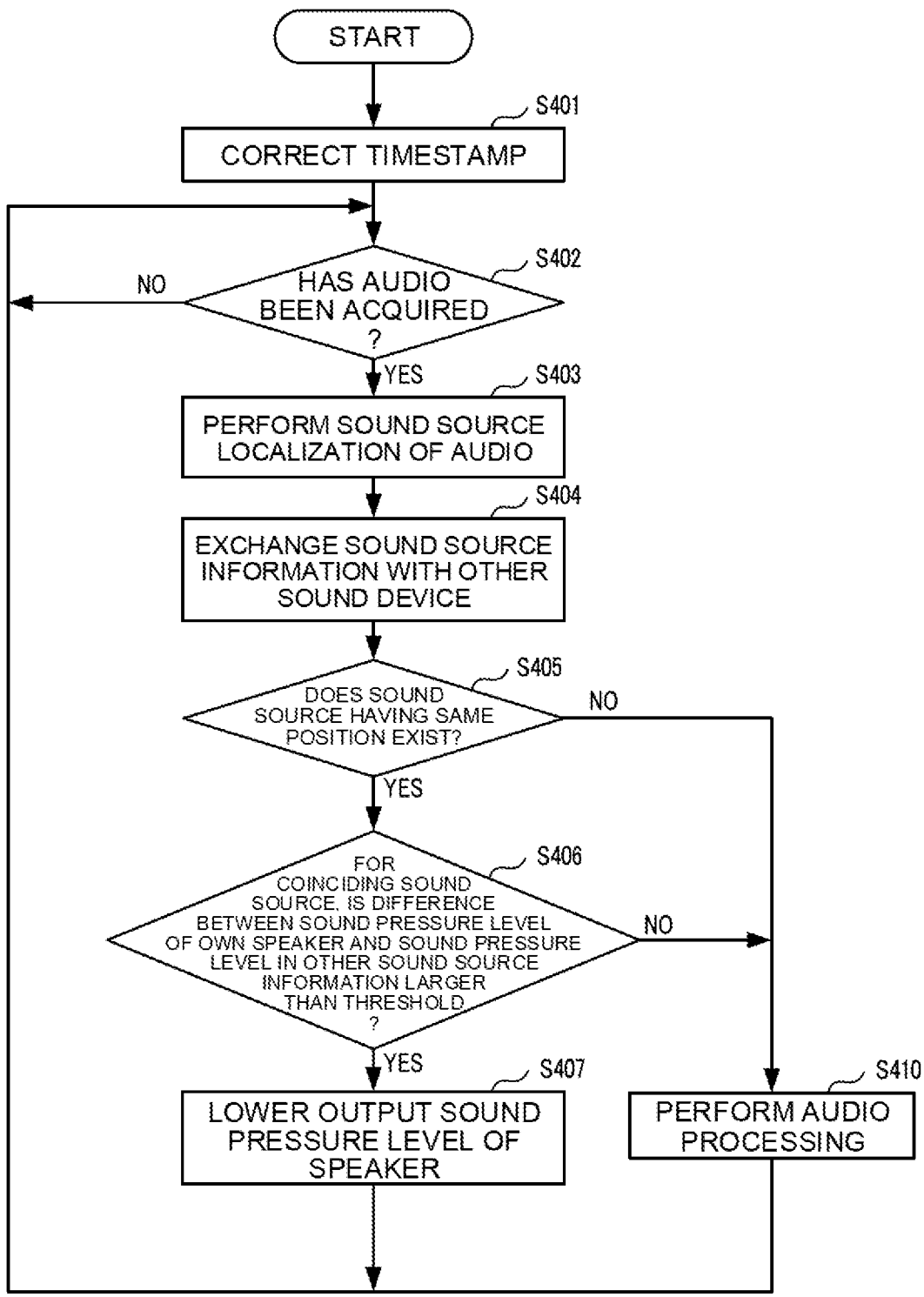
FIG. 9 is a flowchart for describing another example of audio filter processing in the sound system according to the second embodiment of the present disclosure.

The sound system 1 according to the second embodiment may also have the configuration below. FIG. 9 is a flowchart showing another example of sound source filter processing executed by the controller 11 of the sound device 100. The processing of steps S401 to S405 and S410 shown in FIG. 9 is the same as the processing of steps S301 to S305 and S310 shown in FIG. 8. Therefore, the description is omitted.

For example, in the conference system shown in FIG. 1, if the positions of the speakers 15a and 15b of the sound device 100 and the position of participant C approach each other, it is possible that, in the sound device 200, the audio output from the speakers 15a and 15b (for example, the audio of a remote speaking person) and the audio spoken by participant C are determined as a sound sources having the same position. In this case, the sound device 200 acquires the audio spoken by participant C, and also acquires the audio output from the speakers 15a and 15b. However, the audio output from the speakers 15a and 15b represents noise for the sound device 200.

Therefore, as shown in FIG. 9 for example, in step S406, the controller 11 of the sound device 100 determines, with respect to the sound sources having the same position, whether or not the difference (sound pressure difference) between the sound pressure level of the audio output from its own speakers 15a and 15h and the sound pressure level of the sound source in the sound source information acquired from the sound device 200 is larger than a threshold. If the sound pressure level difference is larger than the threshold (S406: YES), the processing proceeds to step S407. If the sound pressure level difference is less than or equal to the threshold (S406: NO), the processing proceeds to step S410.

In step S407, the controller 11 lowers the output sound pressure level of the speakers 15a and 15b. For example, the controller 11 lowers the output sound pressure level of the speakers 15a and 15b by the amount of the sound pressure level difference. Consequently, the sound device 200 is capable of removing the audio output from the speakers 15a and 15b of the sound device 100 that represents noise.

The description above exemplified a case where the sound system 1 is applied to a conference system. However, the sound system of the present disclosure is not limited to this. For example, the sound system of the present disclosure may also be applied to a smart speaker, an AI speaker, or the like. In these cases, a plurality of smart speakers (sound devices) are disposed in the sound system 1. The audio acquired by the smart speakers is, for example, utilized as an audio command that uses audio to execute various processing. According to such a configuration, each smart speaker appropriately acquires the original audio generated in its direction, and malfunctions can be prevented by performing filter processing with respect to unnecessary audio (noise).

It is to be understood that the embodiments herein are illustrative and not restrictive, since the scope of the disclosure is defined by the appended claims rather than by the description preceding them, and all changes that fall within metes and bounds of the claims, or equivalence of such metes and hounds thereof are therefore intended to be embraced by the claims.

The invention claimed is:

1. A sound system comprising:
   a first sound device including a first speaker, a first microphone, and a filter processor, a first sound collection area being set to the first sound device; and
   a second sound device including a second speaker, a second microphone, and a filter processor, a second sound collection area being set to the second sound device, wherein:
   the first sound device collects, via the first microphone, audio spoken by a first user in the first sound collection area and outputs audio from the first speaker to the first user in the first sound collection area, and
   the second sound device collects, via the second microphone, audio spoken by a second user in the second sound collection area and outputs audio from the second speaker to the second user in the second sound collection area;
   the first sound device including:
      a first device detector that detects the second sound device connected to a network, a test audio transmitter/receiver that transmits an audio output instruction to the second sound device that causes test audio to be output from the second speaker, a first audio acquirer that acquires, via the first microphone, first audio output according to the audio output instruction from the second speaker, a first sound source localizer that performs sound source localization with respect to the second speaker based on the first audio acquired by the first audio acquirer, a first position calculator that calculates a first position of the second speaker relative to the first sound device, and a first position notifier that notifies the second sound device of first position information representing the first position calculated by the first position calculator;

the second sound device including:

a second device detector that detects the first sound device connected to the network, a second audio acquirer that acquires, via the second microphone, second audio output from the first speaker, a second sound source localizer that performs sound source localization with respect to the first speaker based on the second audio acquired by the second audio acquirer, a second position calculator that calculates a second position of the first speaker relative to the second sound device, and a second position notifier that notifies the first sound device of second position information representing the second position calculated by the second position calculator; and the filter processor of each of the first sound device and the second sound device performs filter processing on a sound source that is present in an overlapping area where a portion of the first sound collection area and a portion of the second sound collection area overlap, based on a sound pressure level of the sound source.

2. The sound system according to claim 1, wherein the second sound device includes:

an audio outputter that outputs the first audio from the second speaker in the second sound collection area, and a position receiver that receives the first position information notified by the first position notifier.

3. The sound system according to claim 1, wherein first configuration information of the first sound device and second configuration information of the second sound device are exchanged.

4. The sound system according to claim 1, wherein first configuration information includes information relating to a distance and an angle of the first speaker and the first microphone inside the first sound device, and second configuration information includes information relating to a distance and an angle of the second speaker and the second microphone inside the second sound device.

5. The sound system according to claim 1, wherein the first sound device includes a first storage that stores specific information that identifies the first sound device, and first configuration information representing information relating to a device that constitutes the first sound device, and the second sound device includes a second storage that stores specific information that identifies the second sound device, and second configuration information representing information relating to a device that constitutes the second sound device.

6. The sound system according to claim 1, wherein the first sound device includes at least one first speaker, and at least two first microphones, and the second sound device includes at least one second speaker, and at least two second microphones.

7. The sound system according to claim 1, wherein the first sound device includes a first display that displays information, and the second sound device includes a second display that displays information.

* * * * *